US012048659B2

(12) United States Patent
Furman et al.

(10) Patent No.: US 12,048,659 B2
(45) Date of Patent: Jul. 30, 2024

(54) OBSTRUCTION DETECTION SYSTEM AND METHOD

(71) Applicant: Stryker Corporation, Kalamazoo, MI (US)

(72) Inventors: Aaron D. Furman, Kalamazoo, MI (US); Daniel V. Brosnan, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 18/141,488

(22) Filed: May 1, 2023

(65) Prior Publication Data

US 2023/0263676 A1 Aug. 24, 2023

Related U.S. Application Data

(63) Continuation of application No. 17/238,954, filed on Apr. 23, 2021, now Pat. No. 11,638,668, which is a continuation of application No. 16/874,884, filed on May 15, 2020, now Pat. No. 11,013,651, which is a continuation of application No. 16/273,330, filed on Feb. 12, 2019, now Pat. No. 10,687,999, which is a continuation of application No. 14/956,567, filed on Dec. 2, 2015, now Pat. No. 10,206,834.

(60) Provisional application No. 62/090,651, filed on Dec. 11, 2014.

(51) Int. Cl.

| | |
|---|---|
| ***A61G 7/018*** | (2006.01) |
| ***A61G 7/015*** | (2006.01) |

(52) U.S. Cl.

CPC ............ *A61G 7/018* (2013.01); *A61G 7/015* (2013.01); *A61G 2203/30* (2013.01); *A61G 2203/32* (2013.01); *A61G 2203/36* (2013.01); *A61G 2203/726* (2013.01)

(58) Field of Classification Search

None

See application file for complete search history.

(56) References Cited

U.S. PATENT DOCUMENTS

| | | | |
|---|---|---|---|
| 4,769,584 | A | 9/1988 | Irigoyen et al. |
| 4,922,170 | A | 5/1990 | Kawasaki et al. |
| 4,953,053 | A | 8/1990 | Pratt |
| 4,993,777 | A | 2/1991 | LaPointe |

(Continued)

*Primary Examiner* — Whitney Moore

(74) *Attorney, Agent, or Firm* — Warner Norcross + Judd LLP

(57) ABSTRACT

Systems and methods for detecting a pinch event or obstruction to a movable component of a patient support. In some embodiments, the patient support apparatus may include a control system capable of controlling one or more actuator systems coupled to one or more movable components of the patient support apparatus. The control system may operate according to one or more modes of operation in controlling the actuator system to move a component from a first position to a second position. In one embodiment, the control system may receive sensor feedback indicative of one or more operating characteristics of an actuator system, and analyze the sensor feedback differently in one mode than in another. In one embodiment, the controller may receive sensor feedback indicative of both a speed of a component coupled to the movable component and a current of power supplied to an electric motor of the actuator system.

16 Claims, 10 Drawing Sheets

(56) References Cited

U.S. PATENT DOCUMENTS

| | | | |
|---|---|---|---|
| 5,069,000 A | 12/1991 | Zuckerman | |
| 5,235,258 A | 8/1993 | Schuerch | |
| 5,906,017 A | 5/1999 | Ferrand et al. | |
| 6,526,643 B1 | 3/2003 | Renault | |
| 6,555,982 B2 | 4/2003 | Tyckowski | |
| 6,677,720 B2 | 1/2004 | Fraser | |
| 6,907,630 B2 | 6/2005 | Treon | |
| 7,005,884 B2 | 2/2006 | Gunton | |
| 7,145,263 B2 | 12/2006 | Nathan et al. | |
| 7,372,224 B2 | 5/2008 | Gregori | |
| 7,978,084 B2 | 7/2011 | Dixon et al. | |
| 8,039,766 B2 | 10/2011 | Flanagan | |
| 8,418,290 B2 | 4/2013 | Shih | |
| 8,746,773 B2 | 6/2014 | Bruck | |
| 10,206,834 B2 | 2/2019 | Furman et al. | |
| 2005/0172405 A1 | 8/2005 | Menkedick et al. | |
| 2008/0289108 A1 | 11/2008 | Menkedick et al. | |
| 2010/0146704 A1 | 6/2010 | Barthelt | |
| 2011/0066287 A1* | 3/2011 | Flanagan | A61G 7/018<br>700/275 |
| 2014/0259413 A1 | 9/2014 | Johnson et al. | |
| 2014/0310876 A1* | 10/2014 | Roussy | A61G 7/015<br>5/613 |

* cited by examiner

Operational Blocks / Flow Chart

Types of Sensing

Pick any 2:
- Position
- Speed
- Acceleration
- Current
- Power
- Voltage (Back EMF)
- Force (i.e. load cell)

Also,
External Sensors:
- Optical (Laser, IR)
- Magnetic (Wall, Proximity)
- Touch Tape
- Switches

Graphical Representations

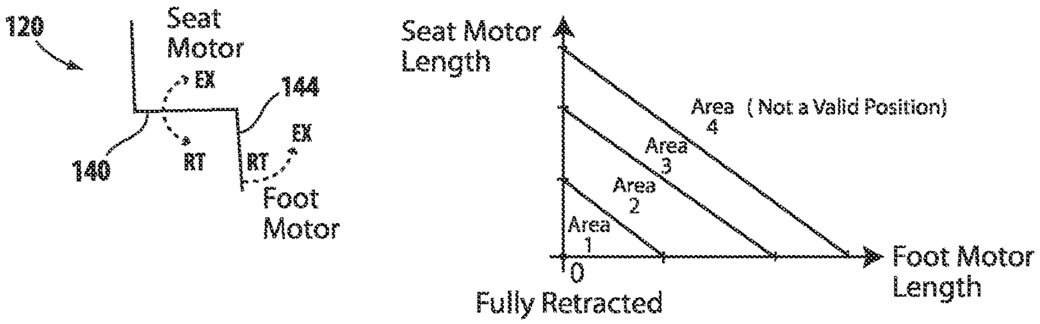

*FIG. 10*

| MODE | AREA | Risk of Pinch | Adjusted Sensitivity |
|---|---|---|---|
| 1 | 1 | Relative High Risk of Retracted Pinch (Hand, Equipment) | Highly Sensitive<br>Current Increase by 5%<br>Speed Decrease by 5% ] Over Time t |
| 2 | 2 | Low-Moderate | Low - Moderate Sensitivity<br>Current + 5%<br>Speed - 5% |
| 3 | 3 | Med- High (Trash Can) | Med-High Sensitivity<br>Current + 10%<br>Speed - 10% |
| 4 | 4 | N/A | N/A |

Note: These can also be made with 3D (3 Motors) or 4D (4 Motors) +, or an Adaptive Algorithm

*FIG. 11*

OBSTRUCTION DETECTION SYSTEM AND METHOD

FIELD OF INVENTION

The present invention relates to a system and method for detecting an obstruction to an actuated component, including detecting an obstruction in the context of patient support apparatuses-such as beds, stretchers, chairs, cots, and the like.

SUMMARY OF THE INVENTION

The present invention provides systems and methods for detecting a pinch event or an obstruction to a movable component of a patient support. In some embodiments, the patient support apparatus may include a control system capable of controlling one or more actuator systems coupled to one or more movable components of the patient support apparatus. The control system may operate according to one or more modes of operation in controlling an actuator system to move a component from a first position to a second position. In one embodiment, the control system may receive sensor feedback indicative of one or more operating characteristics of an actuator system, and analyze the sensor feedback differently in one mode than in another. In one embodiment, the controller may receive sensor feedback indicative of both a speed of a component coupled to the movable component and a current of power supplied to an electric motor of the actuator system. Based on the sensor feedback, the control system may detect pinch events or potential obstructions to the movable component.

In one embodiment, motion of the moveable component may be non-linear. For example, the moveable component may pivot about an axis. As another example, the moveable component may move from the first position to the second position in a curved manner that includes linear motion in conjunction with rotational motion.

The control system according to one embodiment controls an actuator of a patient support, where the actuator is capable of displacing a component of the patient support in response to being driven by an electric motor. The control system may include a motor driver operably coupled to the electric motor and configured to supply power to the electric motor to drive the actuator such that the component is displaced from a first position to a second position. The control system may also include a motor sensor configured to provide a motor sensor output indicative of a sensed characteristic of power supplied to the electric motor, and a controller operably coupled to the motor driver to control supply of power to the electric motor. The controller may be configured to operate according to at least two modes to control the electric motor to displace the component of the patient support from the first position to the second position. A first mode of the at least two modes includes detecting a pinch event based on a first function of said motor sensor output, and a second mode of the at least two modes includes detecting the pinch event based on a second function of said motor sensor output.

In one embodiment, the first mode and the second mode may utilize different thresholds for determining a pinch event based on the motor sensor output. For instance, the motor sensor output may be a current of power supplied to the electric motor, and the first mode may utilize a first current threshold lower than a second current threshold. The controller may detect a pinch event if the current is at or exceeds the first current threshold in the first mode or the second current threshold in the second mode. In this way, the control system may be more sensitive to increases in motor current in the first mode than in the second mode.

The movable component may be any component or feature of the patient support apparatus. For example, the movable component may be one of more of a foot section of the patient support, a middle section of the patient support, a side rail of the patient support, and a frame of the patient support.

A method of operating a patient support according to one embodiment may include supplying power to an electric motor to drive an actuator of the patient support such that a component of the patient support is displaced from a first position to a second position over a first range of motion and a second range of motion. The method includes sensing a speed of at least one of the electric motor and the actuator, and sensing a characteristic of power supplied to the electric motor. For example, the current of power supplied to the electric motor may be sensed. A pinch event may be detected as a function of the sensed characteristic of power and the sensed speed as the component moves from the first position to the second position.

According to one embodiment of the present invention, a control system may operate in accordance with one or more modes of operation to detect pinch events due to an obstruction while potentially avoiding false indications of obstructions. In one embodiment, at least two modes may be implemented, one mode being more sensitive to obstructions than another. In this way, areas or regions of operation in which the chance of a pinch event due to a small and potentially soft object may be associated with more sensitive modes of operation than areas of operation in which an obstruction is possible larger or unlikely.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and is capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 10 is a representative view of a patient support according to one embodiment supplemented with a chart identified areas or regions of operation.

FIG. 11 is a schedule or table of criteria for various modes of operation according to one embodiment.

DESCRIPTION

The inventive features, functions, and systems described herein are applicable to patient support apparatuses, such as beds, chairs, cots, stretchers, operating tables, recliners, and the like. In the illustrated embodiments of FIGS. 1 and 3-6, illustrative patient support apparatuses—in these cases a hospital bed—are shown, and generally designated 20 and 120, respectively. The patient support apparatus 20, 120 may incorporate any one or more of the features, functions, or systems described herein. It is further noted that the patient support apparatus 20, 120 may be configured differently from the illustrated embodiments. For example, one or more features, functions or systems of the illustrated embodiments may be absent or incorporated from one embodiment to another.

Figure 1:
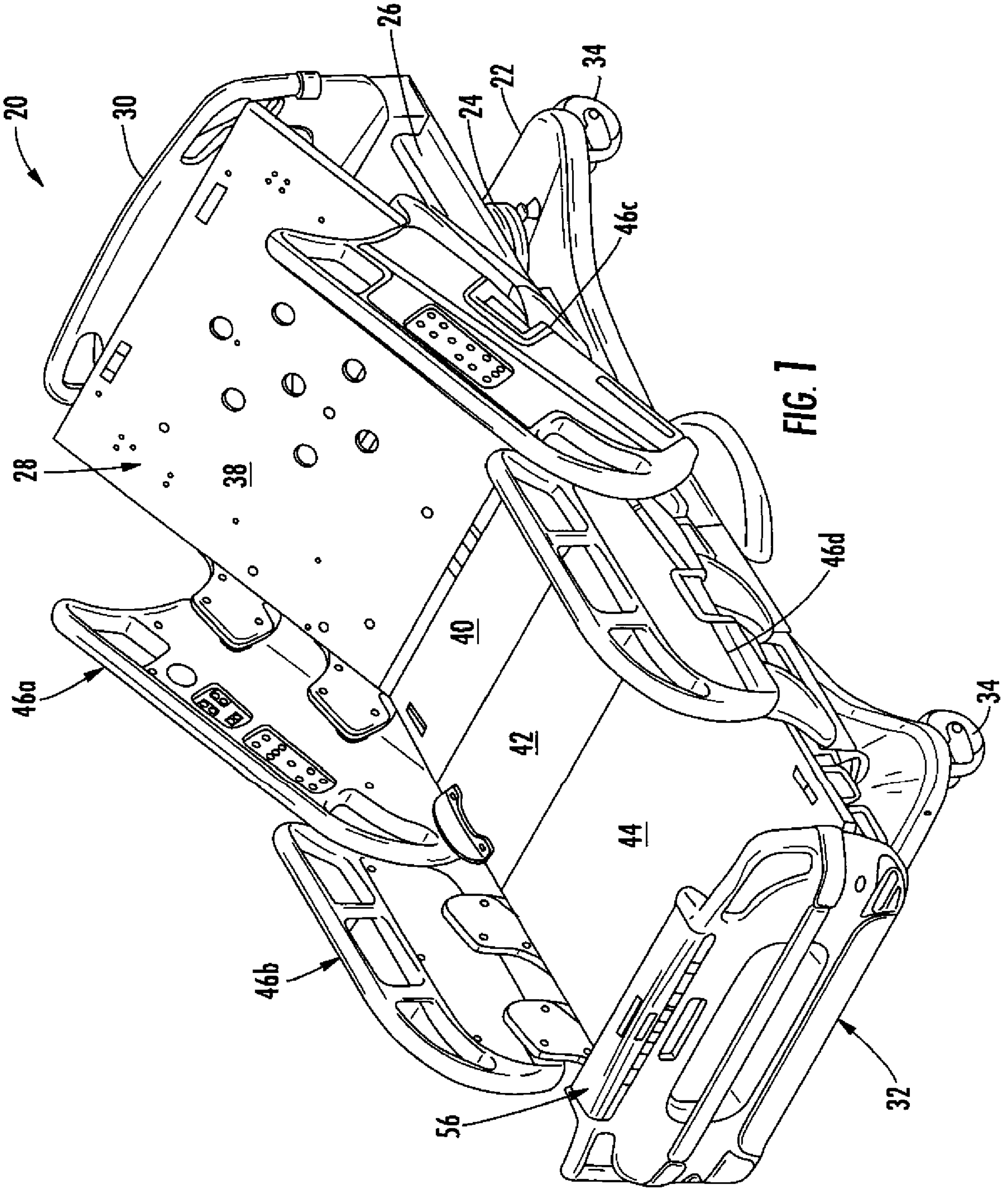
FIG. 1 is a perspective view of an illustrative patient support apparatus that is able to implement any one or more of the various features of the present invention.

In the illustrated embodiment of FIG. 1, the patient support apparatus 20 includes a base 22, a pair of elevation adjustors 24, a frame or litter assembly 26, a patient support surface or deck 28, a headboard 30, and a footboard 32. The base 22 includes a plurality of wheels 34 that can be selectively locked and unlocked so that, when unlocked, the patient support apparatus 20 is able to be wheeled to different locations. The elevation adjustors 24 are adapted to raise and lower the frame 26 with respect to the base 22. The elevation adjustors 24 may include hydraulic actuators, electric actuators, or any other suitable device for raising and lowering the frame 26 with respect to the base 22. In some embodiments, the elevation adjustors 24 operate independently so that the orientation of the frame 26 with respect to the base 22 may also be adjusted.

The frame 26 may provide a structure for supporting the patient support surface 28, the headboard 30, and the footboard 32. The patient support surface 28 may provide a surface on which a mattress, or other soft cushion, is positionable so that a patient may lie or sit thereon. The patient support surface 28 may be constructed of a plurality of sections, some of which are pivotable about generally horizontal pivot axes. In the embodiment shown in FIG. 1, the patient support surface 28 includes a head section 38, a seat section 40, a thigh section 42, and a foot section 44. The head section 38, which is also sometimes referred to as a Fowler section, is pivotable between a generally horizontal orientation (not shown in FIG. 1) and a plurality of raised positions (one of which is shown in FIG. 1). The thigh section 42 and the foot section 44 may also be pivotable in some embodiments.

In addition to the aforementioned components, the patient support apparatus 20 may include four side rails: a right head side rail 46*a*, a right foot side rail 46*b*, a left head side rail 46*c* and a left foot side rail 46*d*. The side rails 46 may be movable between a raised position and a lowered position. In the configuration shown in FIG. 1, all four of the side rails 46*a-d* are raised.

The physical construction of one or more of the base 22, the elevation adjustors 24, the frame 26, the patient support surface 28, the headboard 30, the footboard 32, and the side rails 46 may be the same as disclosed in commonly assigned, U.S. Pat. No. 7,690,059 issued to Lemire et al., and entitled Hospital Bed, the complete disclosure of which is incorporated herein by reference; or as disclosed in commonly assigned U.S. Pat. Publication No. 2007/0163045 filed by Becker et al. and entitled Patient Handling Device Including Local Status Indication, One-Touch Fowler Angle Adjustment, and Power-On Alarm Configuration, the complete disclosure of which is also hereby incorporated herein by reference; or as embodied in the commercially available S3 bed sold by Stryker Corporation of Kalamazoo, Michigan, and documented in the Stryker Maintenance Manual for Stryker's MedSurg Bed, Model 3002 S3, (doc. 3006-109-002 Rev D), published in 2010, the complete disclosure of which is also hereby incorporated herein by reference. The construction of one or more of the base 22, the elevation adjustors 24, the frame 26, the patient support surface 28, the headboard 30, the footboard 32 and the side rails 46 may also take on forms different from what is disclosed in these documents.

Figure 2:
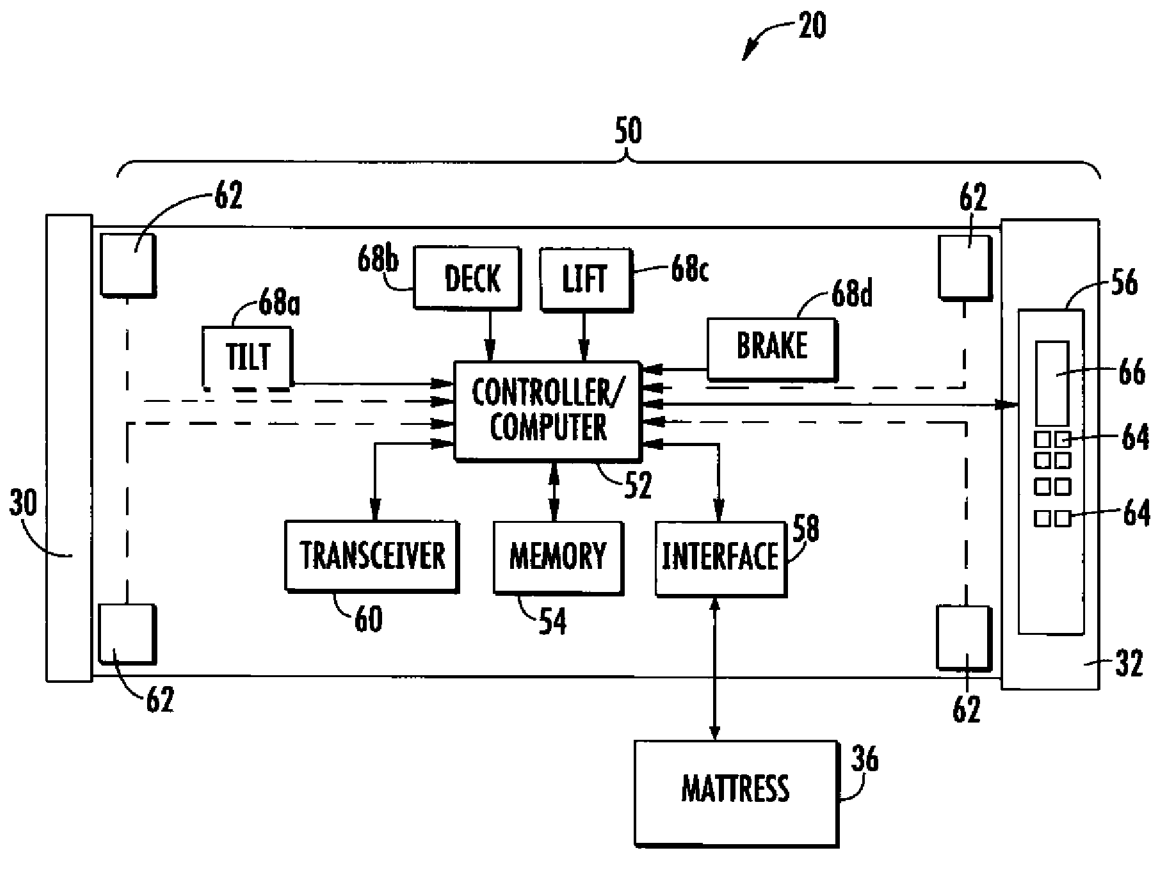
FIG. 2 is a plan view diagram of a control system according to one embodiment that may be implemented into various patient support apparatuses, such as, but not limited to, the one of FIG. 1.

The patient support apparatus 20 may include a control system, such as the control system 50 illustrated as a plan view diagram in FIG. 2. The control system 50 may be configured to control one or more of the features, functions or systems of the patient support apparatus 20, including raising and lowering of the frame 26 with respect to the base 22 and pivoting the one or more sections of the patient support surface 28. The control system 50 in the illustrated embodiment includes a computer or controller 52, a memory 54 in communication with the controller 52, a user interface 56, and a plurality of actuators 68, such as a tilt actuator 68*a*, a deck actuator 68*b*, a lift actuator 68*c*, and a brake actuator 68*d*. Other actuators may also be included, and one or more of the actuators 68*a-d* may be absent. In the illustrated embodiment, the control system 50 includes at least one device interface 58 capable of communicating with one or more electronic devices, such as the mattress 36.

One or more of the actuators 68 may be a linear actuator having an electric motor operably coupled to a connector, which is capable of being mated to another connector disposed to translate linear motion of the mated connectors to movement. The electric motor in one embodiment is operable to extend and retract the coupled connectors, resulting in linear motor or rotational motion, or both, thereof. As will be described herein, the one or more actuators 68 may be configured similar to the illustrated embodiment of FIG. 7, which depicts a representative mechanical and electrical diagram of an actuator system according to one embodiment. It should be understood that any type of actuator may be used, and that the present invention is not limited to an actuator of a specific type or construction. The electric motor of the actuators 68, and therefore control over the actuators 68*a-d*, may be directed by the controller 52. In one embodiment, the controller 52 may include a motor driver capable of directly controlling application of power, and one or more characteristics thereof, to the electric motor of the actuators 68. Alternatively or additionally, the controller 52 may communicate to a motor driver separate from the controller 52. The motor driver in this configuration may be separate from or integrated with an actuator 68. By communicating with the motor driver, the controller 52 may command operation of the actuator 68. Communication may be achieved in a variety of ways, including a control signal (e.g., high/low or on/off signal), a periodic signal indicative of a directed mode of operation, and data, or a combination thereof. The motor driver may include or may be coupled to one or more sensors configured to sense at least one characteristic of power supplied to the electric motor or an operating parameter of the actuator system, or a combination thereof.

As an example, in the illustrated embodiment of FIG. 1, the deck actuator **68*b* may configured to pivot the head section 38 coupled to the frame 26, and may include an actuator connector coupled to a connector of the head section 38. The coupling point of the connectors may be set away from a pivot axis of the head section 38 such that motion of the coupled connectors (and the coupling point) generates a moment of force or torque about the pivot axis of the head section 38. In this way, extension and retraction of the coupled connecters of the deck actuator 68*b* and the head section 38 may pivot the head section 38 about its pivot axis. The foot section 44 may be pivoted in a similar manner, including a deck actuator 68*b* configured to extend and retract to pivot the foot section 44** about a generally horizontal axis.

In an alternative embodiment of the control system 50 of FIG. 2, as shown in phantom lines, the control system 50 may include one or more external sensors 62 configured to provide sensor output to the controller 52. For example, the one or more external sensors 62 may include at least one of a force sensor or load cell, an optical sensor (e.g., a laser sensor or an infrared sensor), potentiometer, a gyroscope-based sensor, a magnetic sensor (e.g., a Hall effect sensor or a proximity sensor), a capacitive sensor or touch tape, and a switch (e.g., a limit switch). In configurations having a plurality of external sensors 62, one of more of the external sensors 62 may be different from the other external sensors 62. The control system 50 may utilize feedback obtained from the external sensors 62 to control operation of the patient support 20. For instance, as will be described in further detail herein, the control system 50 may utilize sensor output or feedback obtained from one or more external sensors 62 in determining presence of an obstruction to motion of one or more components of the patient support.

In the illustrated embodiment, the components of the control system 50 may communicate with each other using conventional electronic communication techniques. In one embodiment, the controller 52 may communicate with the memory 54 and the user interface 56 using I-squared-C communications. Other types of serial or parallel communication can alternatively be used. In some other embodiments, different methods may be used for different components. For example, in one embodiment, the controller 52 may communicate with the user interface 56 via a Controller Area Network (CAN) or Local Interconnect Network (LIN), while it communicates with the memory 54 and the actuators 68 using I squared C. Still other variations are possible.

The user interface 56 may include a plurality of buttons that a caregiver presses in order to control various features of the patient support apparatus, such as, but not limited to, raising and lowering the height of frame 26 via lift actuators **68*a* and/or 68*c*, pivoting one or more sections of the support surface 28 via one or more deck actuators 68*b*, turning on and off a brake (not shown) via brake actuator 68*d*, controlling a scale system integrated into the patient support apparatus, controlling an exit alert system integrated into the support apparatus 20, and/or controlling other features of the patient support apparatus 20. The user interface 56** may further includes a display integrated therein. The display may be a touchscreen display capable of displaying text and/or graphics and sensing the location that a user's finger touches the display, although it should be understood that the display could be modified to be a normal LCD display without touchscreen capabilities that use hard or soft buttons to interact therewith, or still other types of displays.

The controller/computer 52 may include one or more microcontrollers, microprocessors, and/or other programmable electronics that are programmed to carry out the functions described herein. It should be understood that the controller 52 may also include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware, as would be known to one of ordinary skill in the art. Such components can be physically configured in any suitable manner, such as by mounting them to one or more circuit boards, or arranging them in other manners, whether combined into a single unit or distributed across multiple units. Such components may be physically distributed in different positions on patient support apparatus 20, or they may reside in a common location on patient support apparatus 20. When physically distributed, the components may communicate using any suitable serial or parallel communication protocol, such as, but not limited to, CAN, LIN, Firewire, I-squared-C, RS-232, RS-485, etc.

The sensors 62, in some embodiments, may include force sensors that are conventional load cells, or similar force measuring sensors, positioned to detect the amount of downward force exerted by patient support deck 28, and any objects, patient(s), and/or other persons that are exerting downward forces on support deck 28, whether due to gravity or due to other causes. In some embodiments, the force sensors may be configured so that, in addition to downward forces, they are also able to detect forces exerted in generally horizontal directions (both laterally and longitudinally).

When implemented as load cells, the physical arrangement of force sensors may take on a conventional arrangement, such as those found in a variety of different conventional hospital beds. For example, in one embodiment, the position and physical construction of load cells are the same as that found in the S3® bed sold by Stryker Corporation of Kalamazoo, Michigan. These physical details are described in detail in the Stryker Maintenance Manual for Stryker's MedSurg Bed, Model 3002 S3, (doc. 3006-109-002 Rev D), published in 2010, the complete disclosure of which has already been incorporated herein by reference.

In one embodiment, the sensors 62 of the patient support may include four force sensors in communication with the controller 52, which receives the outputs from the force sensors. The force sensors may be positioned adjacent each corner of the patient support surface 28 and cumulatively sense the entire weight of a patient, other person, and/or objects positioned on the patient support surface 28. In one arrangement, the force sensors are positioned such that one force sensor is positioned adjacent each corner of a load frame (not shown), and the force sensors detect forces exerted by a patient support frame upon the load frame (through the force sensors). While the construction of the load frame and patient support frame may vary, one example is disclosed in the commonly assigned U.S. Pat. No. 7,690,059 mentioned above and incorporated herein by reference. Another example is disclosed in the Stryker Maintenance Manual for the Model 3002 S3 MedSurg Bed, which has also already been incorporated herein by reference. Other constructions of the frames and positions of the load cells may also be used.

Turning to the illustrated embodiment of FIGS. 3-6, the patient support apparatus 120 may be configured similar to the patient support 20, including a base 122, a frame or litter assembly 126, a patient support surface or deck 128, a headboard 130, and a footboard 130. These components may be similar to the base 22, the frame 26, the deck 28, the headboard 30, and the footboard 30, respectively. Similar to the plurality of wheels 34 and the elevation adjustors 24 of the patient support 20, the patient support 120 may also include a plurality of wheels 134 and elevation adjustors 124 capable of raising and lowering the frame 126 with respect to the base 122. In the illustrated embodiment of FIG. 3, actuators 168*a*-*b* are respectively coupled to the elevation adjustors 124, and enable raising, lowering, and tilting of the frame 126.

The patient support 120 may further include side rails 146, including a right head side rail 146*a*, a right foot side rail 146*b*, a left head side rail 146*c* and a left foot side rail 146*d*. These side rails 146 may be respectively similar to the right foot side rail 46*b*, the left head side rail 46*c* and the left foot side rail 46*d* of the patient support 20. The patient support 120 may also include a user interface 156 similar to the user interface 56. The user interface 156 in the illustrated embodiment is split into two interfaces: a first user interface 156*a* and a second user interface 156*b*. However, the patient support 120 is not limited to this configuration, and may include more or fewer interfaces or no interface.

The deck 128 of the patient support 120 may have one or more sections, including a head section 128, a middle section 140 and a foot section 144. As can be seen in the illustrated embodiment of FIGS. 3-6, the deck 128 of the patient support 120 does not include a thigh section like the thigh section 42 of the patient support 20. However, it should be understood that the patient support 120 is not limited to the specific construction shown in the illustrated embodiment, and that the patient support 120 may include a thigh section. The one or more sections of the deck 128 may be pivotable similar to the one or more sections of the deck 28 of the patient support 20. For example, in the illustrated embodiment of FIG. 6, the foot section 144 is shown pivoted away from a generally horizontal plane about a generally horizontal axis. The foot section 144 may be coupled to an actuator 170, similar to one embodiment of the actuator 68 described in connection with the patient support 20. The actuator 170 may include an actuator arm 172 coupled to the frame 126, and capable of being extended and retracted to pivot the foot section 144 about the generally horizontal axis. The actuator 170 may be a linear actuator. In the illustrated embodiment of FIG. 6, the patient support 120 is configured such that pivoting of the foot section 144 also results in pivoting of the middle section 140. This pivoting arrangement is often times described as a Gatch. However, it should be understood that the patient support 120 may be configured differently. For example, the foot section 144 may be configured to pivot independently of the middle section 140.

The patient support 120 may include a control system similar to the control system 50 described in connection with the illustrated embodiment of FIG. 2. The control system of the patient support 120 may include portions similar to or identical, or a combination thereof, of the control system 50. For purposes of disclosure, the control system 50 is described herein in connection with both the patient support 20 and the patient support 120. The location of components in the control system 50 may be different depending on the construction of the patient support. For example, the user interface 56 in the control system 50 of the illustrated embodiment of FIG. 2 is shown in the foot board 32, but may be incorporated into a side rail such as the side rail 146*a* of the patient support 120. As another example, the actuator 68*b* of the control system 50 may be coupled in a similar manner to the actuator 170 of the patient support 120.

Figure 7:
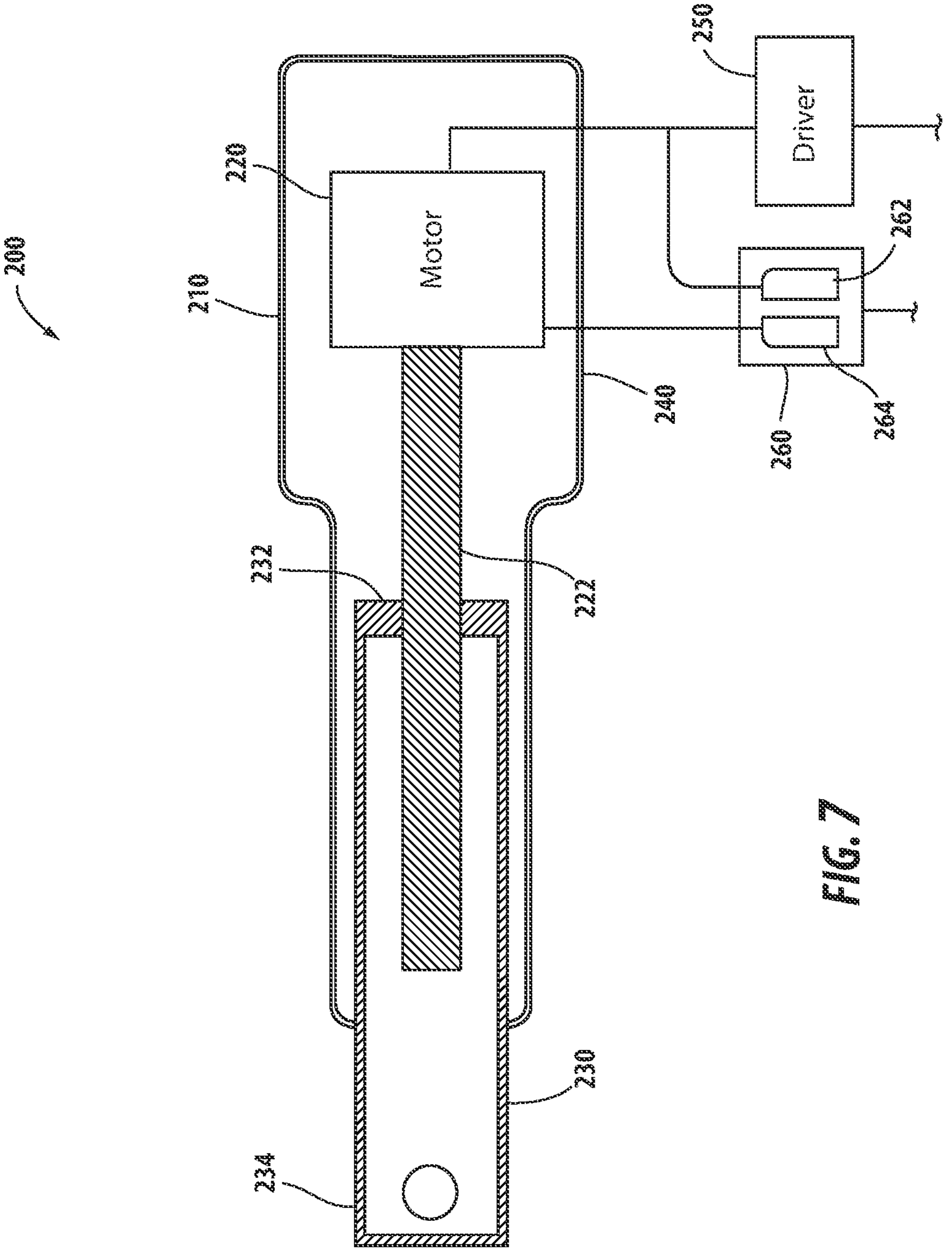
FIG. 7 is a representative electro-mechanical diagram of an actuator system according to one embodiment.

An actuator system according to one embodiment is shown in an electro-mechanical representative diagram in FIG. 7, and generally designated 200. The actuator system 200 may form part of the larger control system 50, but for purposes of disclosure, is described in further detail to facilitate understanding of the obstruction detection system and methods described herein. The actuator system 200 may include an actuator 210 having a housing 240 and a control arm 230 configured to extend and retract from the housing 240. The actuator system 200 may also include an electric motor 220 and a motor driver 250. It should be understood that the actuator system 200 is not limited to use of a linear actuator or the specific type of linear actuator depicted in the illustrated embodiment, and that any actuator or actuator type may be used in the actuator system 200.

In the illustrated embodiment, the control arm 230 may include an actuator connector 234 capable of being connected to a corresponding connector, such as a connector disposed on the base 22, 122, frame 26, 126 or a section of the patient support 20, 120, depending on the application. Likewise, the housing 240 may be connected to a connector, such as a connector disposed on the base 22, 122, frame 26, 126 or a section of the patient support 20, 120. Extension and retraction of the control arm 230 relative to the housing 240 may move components of the patient support 20, 120. The movement may be linear or rotational, or a combination thereof.

In the illustrated embodiment, the electric motor 220 may be coupled to and capable of rotating a shaft 222. Threads of the shaft 222 may interface with a threaded bushing 232 coupled to the control arm 230. The control arm 230 may be generally hollow such that rotation of the shaft 222 in a clockwise direction causes the threaded bushing 232, and therefore the control arm 230, to move in closer proximity to the electric motor 220. Likewise, rotation of the shaft 222 in a counter-clockwise direction causes the threaded bushing 232 and the control arm 230 to move farther away from the electric motor 220. In this manner, by controlling the direction and duration of activation of the electric motor 220, the control arm 230 may translate rotation of the shaft 222 by the electric motor 220 to linear motion.

The motor driver 250 of the actuator system 200 may be configured to supply power to the electric motor 220 to control one or more characteristics of operation of the electric motor 220. As an example, the one or more characteristics may include shaft speed, duration of activation, and direction of rotation. The manner in which power is supplied to the electric motor 220 to control operation thereof depends on the type of electric motor 220. For example, if the electric motor 220 is an AC motor, the power supplied to the electric motor 220 may be AC, and the speed of the electric motor 220 may be controlled by changing the frequency of the supplied AC power. As another example, the electric motor 220 may be a DC motor for which the motor driver 250 provides DC power to control. Changing the DC supply voltage or the duty cycle of DC power supplied to the DC motor may affect its speed. The motor driver 250 may be in communication with the controller 52 of the control system 50, and may receive commands therefrom to control operation of the electric motor 250. In one embodiment, the motor driver 250 may form part of the control system 50, and may be integrated into the actuator 210 within the housing 240. Alternatively, the motor driver 250 may be separate from the housing 240 but part of the control system 50.

The actuator system 200 may also include a sensor system 260 including one or more sensors capable of providing sensor output indicative of one or more characteristics of the actuator system 200. In the illustrated embodiment, the sensor system 260 includes a motor sensor 262 coupled to the power supplied by the motor driver 250 to the electric motor 220. The motor sensor 262 may provide sensor output indicative of a characteristic of power supplied to the electric motor 220. For example, the sensor output may indicative of at least one of voltage and current supplied to the electric motor 220. Voltage may be sensed via a resistor divider network, and current may be sensed via a current sense resistor or a current loop.

The sensor system 260 may also include a speed sensor 264 coupled to the electric motor 220. The speed sensor 264 may be any type of sensor capable of providing output indicative of a shaft speed or shaft velocity of the electric motor 220. To provide some examples, the speed sensor 264 may be a Hall Effect based sensor or a motor encoder based sensor. The Hall Effect based sensor in one embodiment produces a quadrature encoded output that may be used to determine position, direction and velocity. As another example, the speed sensor 264 may be integrated into to the motor sensor 262, and provide speed sensor output based on back electromotive force (emf) generated by the electric motor 220 in response to supply of power by the motor driver 250. In one embodiment, the speed sensor 264 may be a position sensor whose output is a current position of the electric motor 220, and therefore, over time, is indicative of a speed of the electric motor 220.

The speed sensor 264 may provide a periodic output having a frequency that tracks the speed or velocity of the electric motor 220. In an alternative embodiment, the output of the speed sensor 264 may be a signal whose instantaneous voltage corresponds to a speed of the electric motor 220. In another alternative embodiment, the speed sensor 264 may communicate the current speed in the form of data to the controller 52 of the control system 50. In an alternative embodiment in which the speed sensor 264 is a position sensor, the output may be a current position communicated to the controller 52.

As discussed herein, the actuator system 200 may be incorporated into various parts of the patient support 20, 120, and may be used to impart linear motion or rotation motion, or both, of a component of the patient support 20, 120. As an example embodiment of rotational movement, the actuator 210 may be the actuator 170 of the patient support 120, and may be connected between the foot section 144 and the frame 126 such that extension and retraction of the control arm 230 causes the foot section 144 to rotate about a generally horizontal axis at or near one of end of the foot section 144. The foot section 144 is shown in a pivoted configuration in the illustrated embodiment of FIG. 6.

As another example embodiment of rotational movement, the actuator 210 may be the actuator 68*a* connected to the head section 38 of the patient support 20. As shown in the illustrated embodiment of FIG. 1, the head section 38 is pivoted away from a generally horizontal plane about a generally horizontal axis at or near an end of the head section 38. Extension or retraction of the actuator arm 230, depending on the configuration, may lower the head section 38 from this position to the generally horizontal plane.

Figure 3:
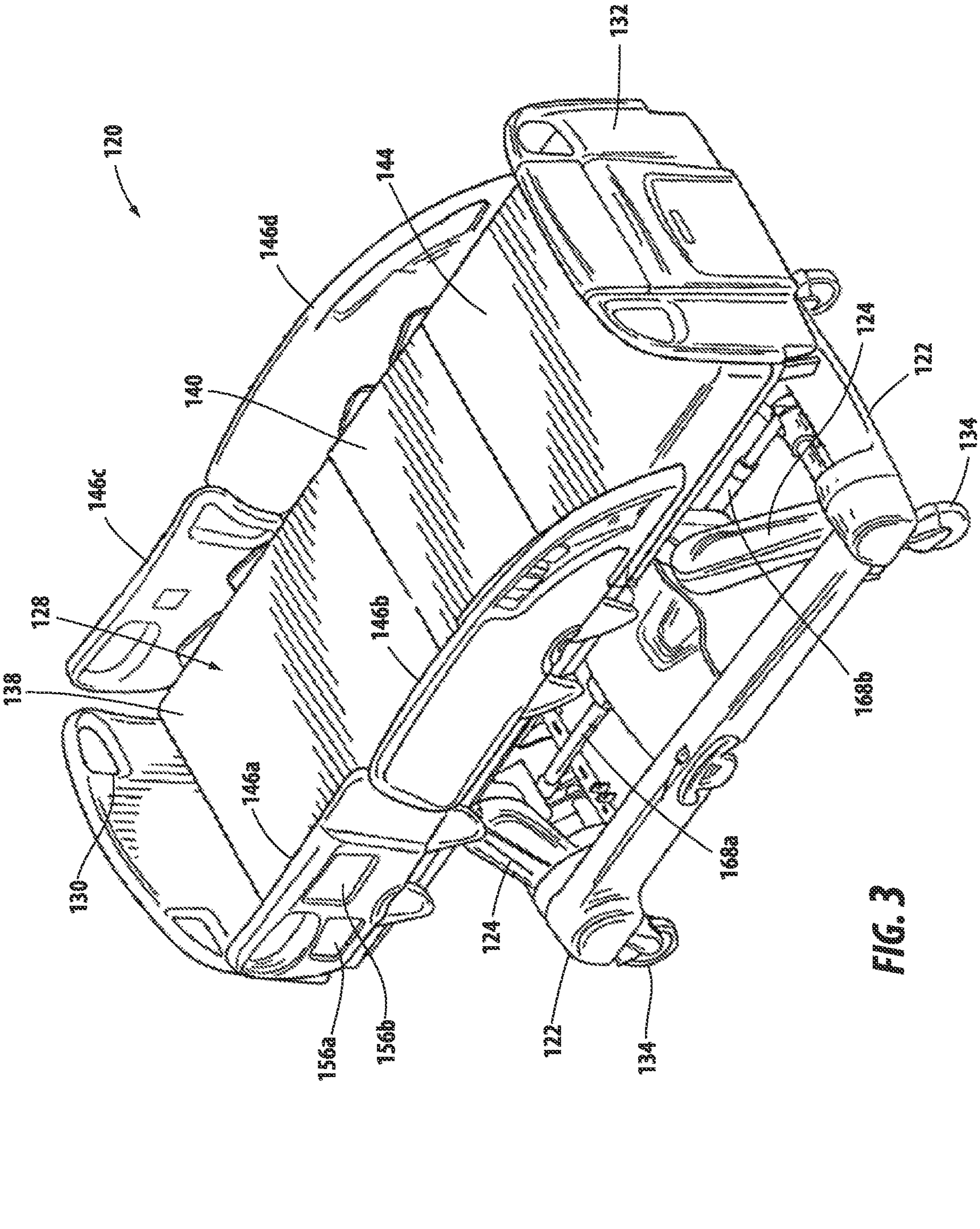
FIG. 3 is a perspective view of an illustrative patient support apparatus that is able to implement any one of more of the various features of the present invention.
Figure 4:
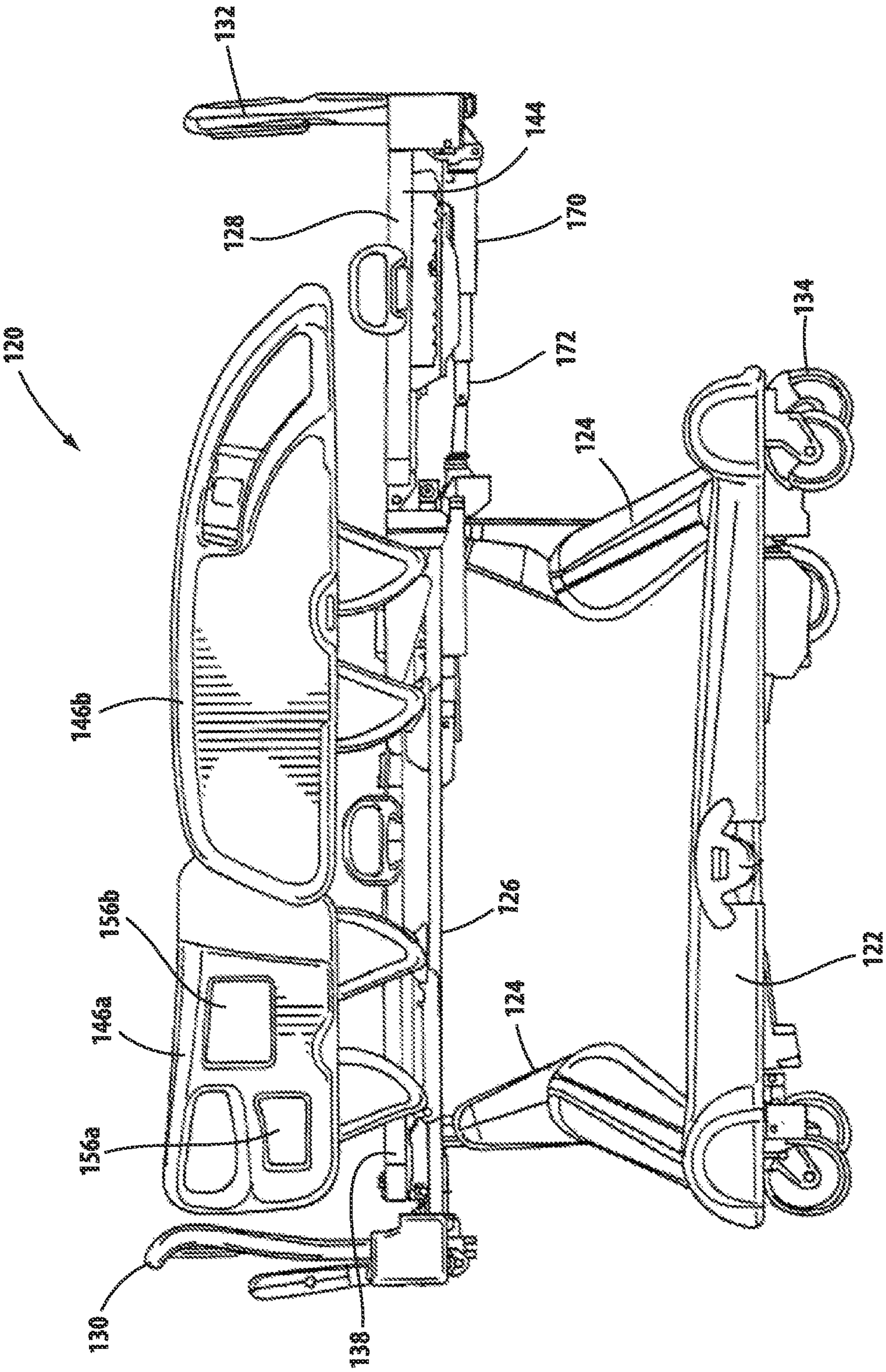
FIG. 4 is a side view of the illustrative patient support apparatus.
Figure 5:
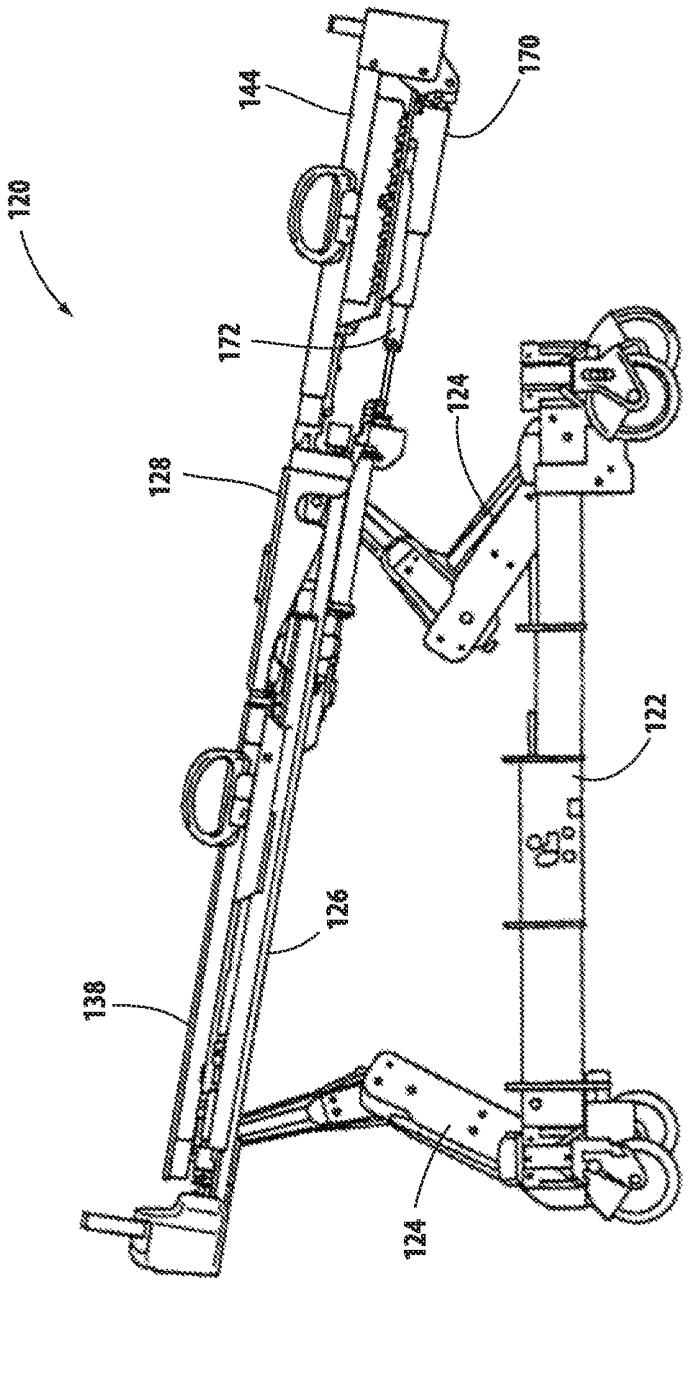
FIG. 5 is another side view of the illustrative patient support apparatus.
Figure 6:
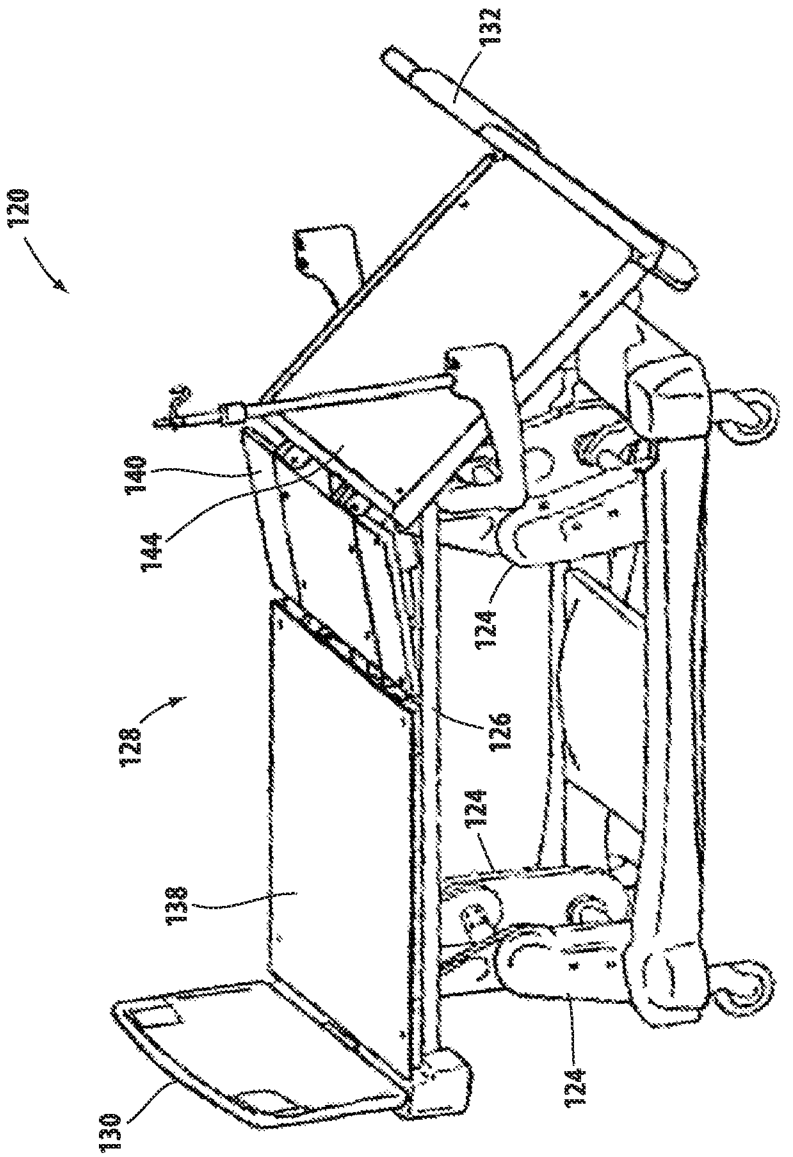
FIG. 6 is another perspective view of an illustrative patient support apparatus.

In one embodiment of the patient support 120, first and second actuators 210 may be used in place of the actuators 168*a-b* of the illustrated embodiment of FIG. 3. In this example, extension of the first actuator 210 may raise one end of the frame 126. Independent actuation of the first and second actuators 210 may allow tilting of the frame 126 or raising and lowering of the frame 126.

Yet another embodiment that utilizes the actuator system 200 includes configuring one or more of the side rails 46*a-d*, 146*a-d* to raise and lower relative to the frame 26, 126. In this way, the patient support 20, 120 may enable a patient or a caregiver, or both, to control operation of one or more side rails from a user interface. In one embodiment, a manual override may be incorporated to allow raising or lowering of a side rail using both the control system 50 and manual operation.

For purposes of disclosure, the actuator system 200 is described in connection with several example embodiments of the patient support 20, 120. It should be understood that the patient support 20, 120 is not limited to use of the actuator system 200 in connection with each of the example embodiments, and that some or all actuators of the patient support 20, 120 may be configured differently. Further, the example embodiments described herein should not be interpreted to limit the patient support 20, 120 to embodiments in which only one actuator is configured according to the actuator system 200. The patient support 20, 120 may include a plurality of the actuator systems 200.

Figure 8:
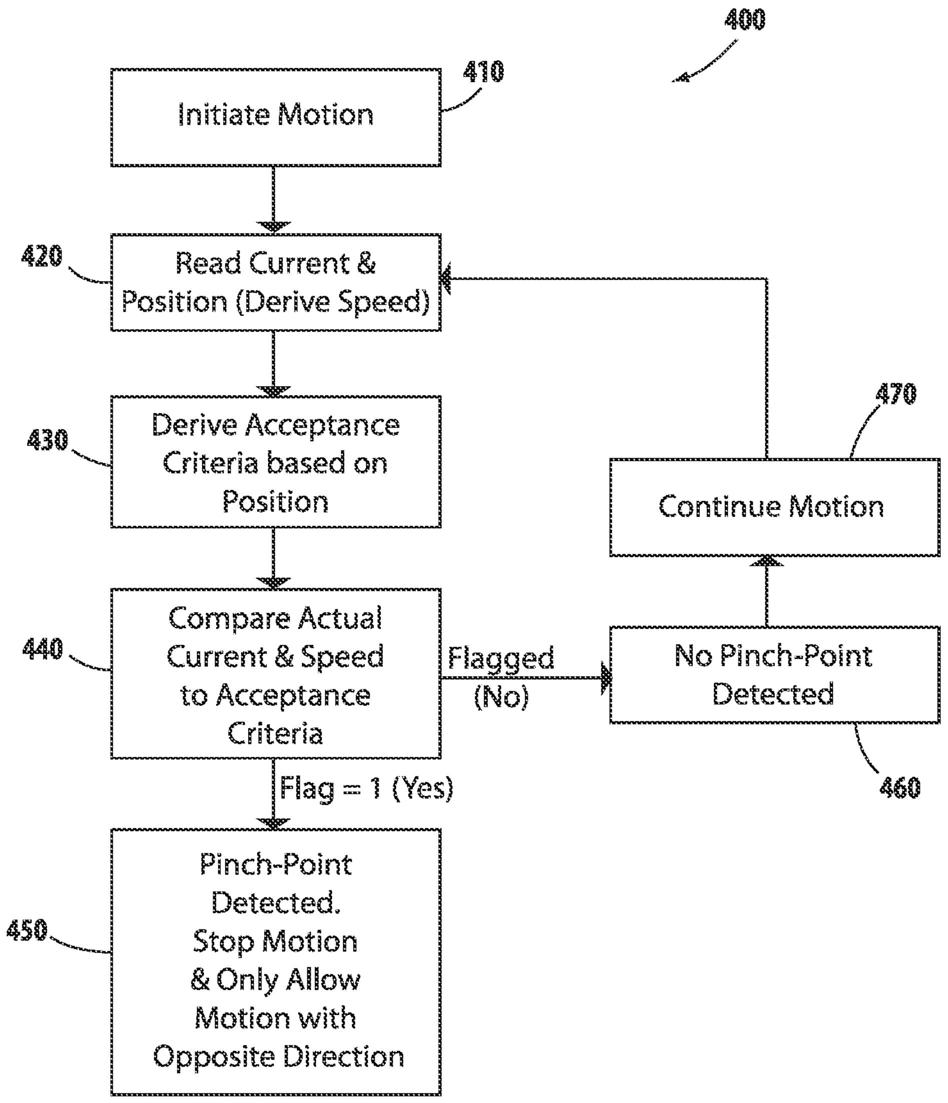
FIG. 8 is a method of operating the patient support apparatus according to one embodiment.

A method of operating the actuator system 200 in conjunction with the control system 50 is shown in FIG. 8, and generally designated 400. However, it should be understood that the method 400 may be implemented in connection with any of the embodiments described herein. The method 400 may include initiating a motion of the actuator arm 230 of the actuator 210 to impart movement of a component of the patient support 20, 120 from a first position to a second position. Step 410. In one embodiment, the motion of the component from the first position to the second position may be in one direction. In moving the actuator arm 230, the control system 50 may operate according to one or more modes to determine whether an obstruction is present. In the illustrated embodiment, the various modes of operation involve different acceptance criteria. However, the modes of operation may be different in other ways, such as operating at different speeds and directions.

It should be understood that the method 400 is not limited to use in connection with motion of a single component, and that the mode of operation may include motion of two or more components by one or more associated actuator systems 200. For example, in the illustrated embodiment of FIG. 10, the foot section 144 and the middle section 140 may be actuated by separate actuator systems 200. In this embodiment, the method 400 may implement different modes of operation, or acceptance criteria, for detecting a pinch event based on the positions of the foot section 144 and the middle section 140, or the corresponding positions of the associated actuator arms 230. As depicted in the illustrated embodiment of FIG. 10, the corresponding positions of the actuator arms 230 may define regions or areas associated with a mode of operation or acceptance criteria for detecting a pinch event. The regions may be defined in a similar manner in embodiments in which three, four, or more actuator systems 200 are being operated to conduct coordinated movement of a plurality of components of the patient support 20, 120.

In the illustrated embodiment of FIG. 8, the mode of operation may depend on at least one of (a) the position of the actuator arm 230 and (b) the position of the component (e.g., the foot section 144) being moved by the actuator arm 230. However, the method 400 may be different. For example, the mode of operation may depend on one or more other factors, such as the speed of the actuator 210, or the mode of operation may remain static such that one mode of operation is utilized in moving a component of the patient support 20, 120 from the first position to the second position. In the illustrated embodiment, in moving the component of the patient support 20, 120 from the first position to the second position, the control system 50 may operate according to at least two modes, including a first mode of operation and a second mode of operation.

After initiating motion of the actuator arm 230, the control system 50 may obtain sensor information from the sensor system 260. Step 420. The sensor system 260, as described herein, may provide motor sensor output indicative of a characteristic of power supplied to the electric motor 220 of the actuator 210. In the illustrated embodiment, the motor sensor output is indicative of the amount of current being supplied to the electric motor 220. The sensor system 260 may also provide speed sensor output indicative of a speed of at least one of the electric motor 220 or the actuator arm 230. The speed sensor output may be position information indicative of the speed, and from which the control system 50 can derive the speed of the electric motor 220. The method 400 may include sensing a different set of parameters, such as sensor output indicative of acceleration in place of or in addition to the speed sensor output.

The control system 50 may determine the mode of operation, or the acceptance criteria, based on the position of the component being moved (e.g., the foot section 144) or the actuator arm 230, or a combination thereof. Step 430. The position of the component being moved may be obtained in a variety of ways, including, for example, from a position sensor (not shown) or based on the amount of time and the speed at which the electric motor 220 is operated. In the illustrated embodiments of FIGS. 9 and 10, the method 400 may utilize three modes of operation based on the position of the actuator arm 230 or the component being moved, or both, to determine whether an obstruction is present. In this way, presence detection of an obstruction may be tailored to the state or position of the component being moved. For example, if the component is being moved throughout a range of positions in which there is a higher chance of a pinch or obstruction with respect to smaller and potentially softer objects, such as small equipment, a cable, or a hand, the mode of operation may be tailored such that the criteria for determining presence of an obstruction are more sensitive. If the position of the component, and the range in which it is being moved, is considered to present a lesser chance of an obstruction or a pinch event, the criteria may be less sensitive. Additionally, if the position of the component, and the range in which it is being moved, is more likely to be obstructed by larger objects rather than small objects, the criteria may be tailored accordingly. By basing the criteria for detecting presence of an obstruction on the position of the component being moved or the range in which the component is being moved, the method 400 may be tailored depending on the likelihood of a pinch event or the type of pinch event (e.g., large or small objects), or both. This may aid in avoiding false detection of a pinch event when an obstruction is not actually present, while also facilitating accurate detection of a pinch event when an obstruction is actually present.

The various modes of operation of the method 400 will now be described in further detail with respect to the illustrated embodiments of FIGS. 9, 10 and 11. For purposes of disclosure, in the illustrated embodiment of FIG. 9, the actuator arm 230 is shown rotating a foot section 144 of the patient support 120, and in the illustrated embodiment of FIG. 10, two components—the foot section 144 and the middle section 140 of the patient support 120—are being moved by separate actuator systems 200. However, any component or combination of components of the patient support 20, 120 may be moved, linearly or rotationally, or both, according to the method 400. Further, although the method 400 is described in connection with three modes of operation, it should be understood that more or fewer modes may be included.

Figure 9:
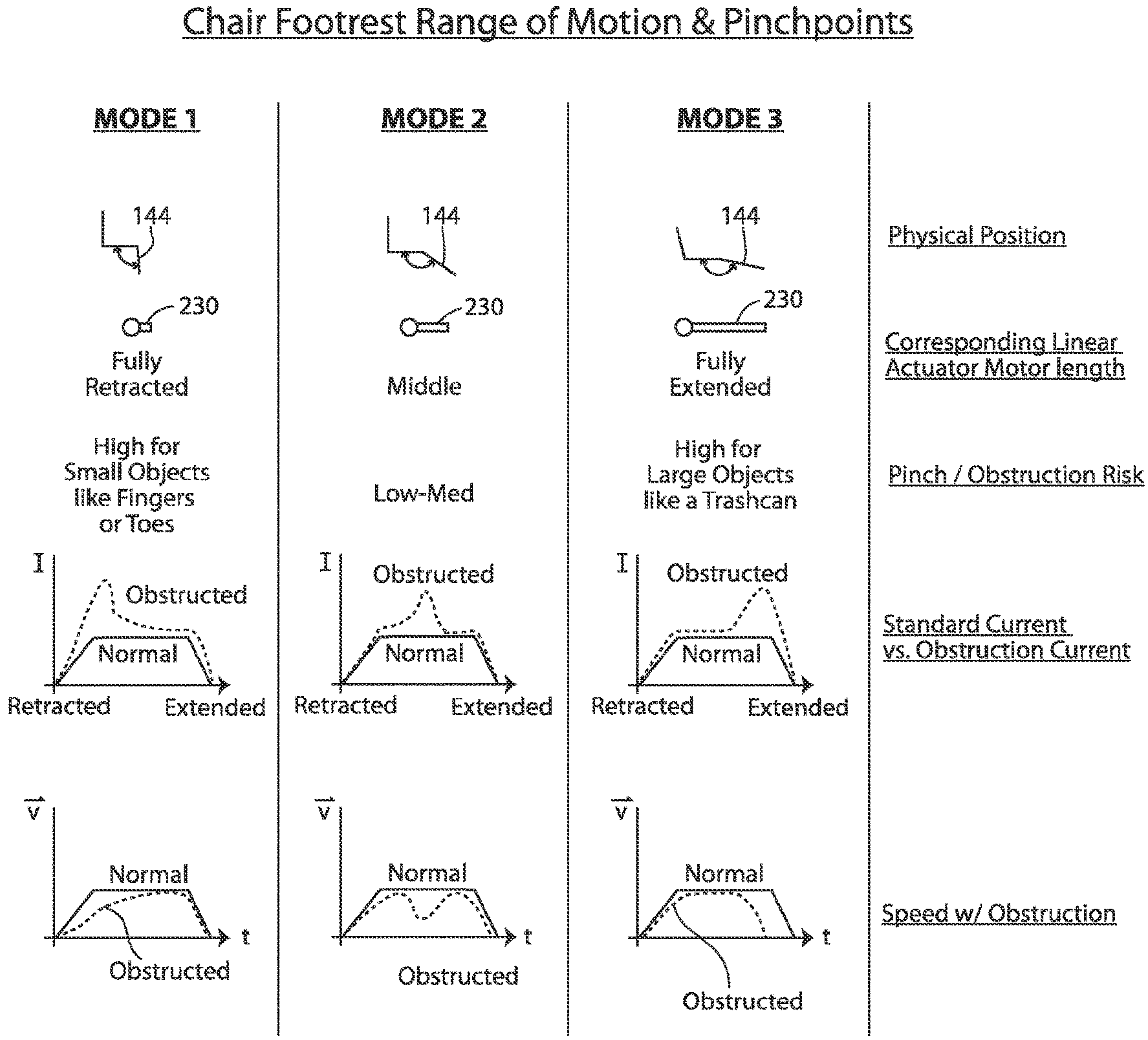
FIG. 9 is a schedule or table of criteria for various modes of operation according to one embodiment.

In the illustrated embodiment of FIG. 9, three modes of operation may be utilized based on the position of the actuator arm 230, which actuates the foot section 144 of the patient support 120. The first mode may be associated with a first range of motion that includes a fully retracted position of the actuator arm 230. The fully retracted position may correspond to a first positional limit on the full range of motion of the foot section 144. At the first positional limit, the foot section 144 may be at a down position at which the foot section 144 does not rotate further about the generally horizontal axis. The second mode may be associated with a second range of motion between the fully retracted position and a fully extended position, neither of which are included in the second range of motion associated with the second mode. The third mode may be associated with a third range of motion that includes the fully extended position of the actuator arm 230, which may correspond to a second positional limit on the full range of motion of the foot section 144. At the second positional limit, the foot section 144 may be substantially aligned with the generally horizontal plane.

In the illustrated embodiment, as shown in the table of FIG. 9, the method 400 may include receiving motor sensor output indicative of a current supplied to the electric motor 220 and speed sensor output indicative of a speed of the electric motor 220. If one or both of the current and the speed are equal to or deviate from associated thresholds, a pinch event or an obstruction may be detected. Steps 440, 450. The criteria for the current and the speed may change depending on the mode of operation.

In the first range of motion, there may be a higher chance of a pinch event or presence of an obstruction that is small and potentially soft. For example, if one or more components clear another component by a few inches, and the direction of motion would decrease this clearance, the range of motion may be considered to present a higher chance of a pinch event for small objects. Accordingly, the first mode of operation may utilize acceptance criteria or thresholds that are more sensitive. For example, as shown in the table of FIG. 9, the speed or velocity threshold is higher in the first mode than in the second and third modes. In the first mode, relatively small deviations or decreases in speed may trigger detection of a pinch event. An increase in current above a threshold may also trigger detection of a pinch event or presence of an obstruction. In this way, if one or both of the current and the speed are equal to or deviate from associated thresholds, a pinch event or presence of an obstruction may be detected. Steps 440, 450. If a pinch event is detected, the control system 50 may direct the actuator 210 to stop, and only respond to commands to move the actuator arm 230 in a direction opposite of the direction of motion during which a pinch event was detected. Step 450. In one embodiment, in response to detecting a pinch event, the control system 50 may direct the actuator 210 to stop, and to reverse direction for a duration of time to provide clearance for potential removal of the detected object.

If a pinch event is not detected, the control system 50 may continue operation and movement of the component of the patient support 20, 120. Steps. 460, 470. As the actuator arm 230 moves through its range of motion, the control system 50 may select or determine acceptance criteria associated with the position of the actuator arm 230. In this way, the mode of operation may change as the control system 50 moves the component of the patient support 20, 120 from the first position to the second position.

In one embodiment, detection of a pinch event may depend on both the current and the speed being equal to or deviating from their associated thresholds. Presence of an obstruction may cause an increase in current due to additional torque being applied by the electric motor 220, and may also slow the shaft velocity of the electric motor 220. However, an increase in current, alone, may be due to something other than a pinch event. In one embodiment, by looking at both the current and the velocity of the motor 220, and determining whether both are equal to or deviate from an associated threshold, the method 400 may potentially avoid falsely detecting presence of an obstruction.

In the second range of motion, associated with the second mode of operation, the acceptance criteria used in the method 400 may utilize criteria different from the first mode of operation. More specifically, the threshold for the current may be substantially the same but the velocity threshold is different in the second mode of operation. The second range of motion in this embodiment may be considered less susceptible to pinch events, and therefore the velocity threshold may be reduced such that a pinch event is detected based on a larger decrease in speed, as compared to the first mode of operation. For example, a decrease in speed that would be result in detection of a pinch event in the first mode of operation may be insufficient to result in detection of a pinch event in the second mode of operation. In this way, false detection of a pinch event in the second mode of operation may be avoided. It should be understood that the current threshold may also be different in the second mode from the first mode.

In the third range of motion, associated with the third mode of operation, the criteria may be different from the criteria of the first and second modes of operation. More specifically, the threshold for the current may be substantially the same as that in the first and second modes of operation, but the velocity or speed threshold is different in the third mode of operation from the first and second modes of operation. The third range of motion may be considered susceptible to pinch events caused by presence of larger objects than by smaller objects. Larger objects are more likely to result in significant changes in speed of the actuator system 200. Accordingly, the velocity threshold may be further reduced as compared to the first and second modes.

The table of FIG. 9 depicts the thresholds for one embodiment for use in the method 400, along with representative measurements of current and speed for different ranges of motion. The representative measurements are shown in phantom lines, and illustrate the current and speed measurements that result from obstruction conditions during each mode of operation. The obstruction conditions for each mode of operation are representative of the type of obstruction that may be present during each mode of operation. For example, presence of a soft object during the first mode of operation may cause a small decrease in speed of the electric motor 230. And, on the other hand, presence of a large object (e.g., a trashcan) during the third mode of operation may cause a significant decrease in speed of the electric motor 230.

As can be seen in the illustrated embodiment of FIG. 9, the current may increase in response to presence of an obstruction during each of the three modes. The current increase may be indicative of an increase in torque on the shaft of the electric motor 220. However, as noted herein, each type of obstruction may have a different effect on the speed of the electric motor 230. The smaller, softer object associated with the first mode of operation causes a smaller decrease in velocity than the larger object associated with the third mode of operation. By using criteria specific to a range of motion of a component of the patient support 20, 120, the type of obstruction likely to be present, or a targeted type of obstruction, or a combination thereof, the method 400 may be tailored to provide accurate detection of pinch events.

Although the method 400 is described in connection with using current and speed as criteria for detecting a pinch event, it should be understood that the method 400 is not so limited. For example, the criteria may be based on at least one sensor output indicative of at least one of position, speed, acceleration, current, power, voltage (including back emf), and force (i.e., a load cell). In one embodiment, the criteria may include at least two of position, speed, acceleration, current, power, voltage (including back emf), and force. In addition to or alternative to any one of these criteria, the method may utilize one or more external sensor outputs from at least one external sensor, such as an optical sensor (e.g., a laser or infrared sensor), a potentiometer, a gyroscope-based sensor, a magnetic sensor (e.g., a Hall effect or proximity sensor), a capacitive sensor or touch tape, and a switch (e.g., a limit switch). One or more of these sensor outputs may be used as criteria for detecting a pinch event according to the method 400. The criteria for one mode may also be different from another mode. For example, current and speed may be used during a first mode of operation, and acceleration and current may be used during a second mode of operation. As another example, one mode of operation may not be associated with any criteria, whereas another mode is associated with one or more criteria.

Further, the mode of operation, or the thresholds for one or more criteria used in the method 400, may be based on the one or more sensor outputs described herein. For example, rather than or in addition to basing the mode of operation on the position of the actuator arm 230, the control system 50 may determine the mode of operation based on sensor output from an accelerometer. It is further noted that the thresholds used during one or more of the modes of operation of the method 400 may be predetermined. However, it should be understood that the method 400 is not limited to use of predetermined thresholds or criteria. The criteria used during a particular mode and the thresholds associated with that criteria may be dynamically determined. In other words, the method 400 may determine criteria, and derive thresholds for the criteria in an adaptive manner or according to an adaptive algorithm In the illustrated embodiments of FIGS. 10 and 11, as mentioned here, the method 400 may be implemented in connection with coordinated motion of more than one component of the patient support 20, 120. More specifically, in the illustrated embodiment, first and second actuators 210 may be controlled by the control system 50 to rotate both the foot section 144 and the middle section 140 in a coordinated manner. Coordinated movement of the foot section 144 and the middle section 140 may occur simultaneously or in stages such that one section moves while another remains still.

In the illustrated embodiment, the one or more modes of operation may correspond to regions or areas defined by the relative positions of the actuator arms 230 of the actuators 210 associated with the components being moved in a coordinated manner. Similar to the illustrated embodiment of FIG. 9, areas or regions of operation in which there may be a higher chance of a pinch event with respect to a small and potentially soft object may be associated with a more sensitive mode of operation than areas of operation where there is little or no chance of such a pinch event. And, similar to the illustrated embodiment of FIG. 9, the modes of operation, the criteria, and the thresholds may vary from application to application.

In the illustrated embodiments of FIGS. 10 and 11, a first area or region of operation may correspond to an area in which both the first and second actuators 210 are near their fully retracted positions. This first area or region may be associated with the first mode of operation. As indicated in the table of FIG. 11, the thresholds for current and speed may be adjusted from a baseline. For example, the current threshold may be increased by 5% over a given time t, and the speed threshold may be decreased by 5% over a given time t. It should be understood that the adjustment may vary from application to application.

A second area or region of operation may be defined by one or both of the first and second actuators 210 being extended to a medial distance between the fully retracted position and a fully extended position. This second area or region may be associated with the second mode of operation. As an example, the first and second actuators 210 may be configured in the second area of operation where the first actuator 210 associated with the foot section 144 is extended toward the medial distance, but the second actuator 210 associated with the middle section 140 remains fully retracted. In this second area of operation, there may be a lesser chance of a pinch event than in the first area of operation. The thresholds for the criteria, such as current and speed, may be adjusted accordingly to facilitate in avoiding falsely detecting a pinch event. In the illustrated embodiment, the current threshold may be increased by 15%, and the speed threshold may be decreased by 15%. In this way, a greater amount of torque or current and a greater decrease in speed would trigger detection of pinch event as compared to the thresholds used in the first area of operation.

A third area or region of operation may be defined by one or both of the first and second actuators 210 being at or near its fully extended position. This third area or region may be associated with the third mode of operation. In the third area of operation, the chance of a pinch event occurring may be more than in the second area of operation but less than in the first area of operation. As a result, the baseline adjustment to the thresholds may configured such that the control system 50 is more sensitive than in the second mode of operation but less sensitive than in the first mode of operation. In the illustrated embodiment, the baseline adjustment of the thresholds is a 10% increase in the current threshold, and a 10% decrease in the speed threshold. It should, however, be understood that the baseline adjustment for associated thresholds of one or more criteria may be different depending on the application. As an example, if the third area of operation is considered less susceptible to pinch events than the second area of operation, the baseline adjustment may be different such that the second mode of operation is more sensitive than the third mode of operation. It should also be understood that rather than or in addition to the baseline adjustment, modes of operation may be associated with an absolute threshold or a dynamic threshold for one or more criteria.

In the illustrated embodiment of FIG. 11, there is a fourth region or area of operation identified in the table. This region is identified primarily to facilitate understanding because the coordinate system used in FIG. 10 to identify areas of operation may define an area beyond which the patient support 20, 120 may not operate. As a result, the fourth region or area of operation is not associated with any criteria or thresholds.

For purposes of disclosure, the method 400 is described in connection with a variety of components of the patient support 20, 120. It should be understood that the one or more components may include any movable feature of the patient support 20, 120. For example, the method 400 may be utilized in connection with actuating one of more of the siderails 46*a-d*, 146*a-d* or in elevating the frame 26, 126. Movement of the siderails 46*a-d*, 146*a-d* may form areas of operation potentially susceptible to pinch events. By implementing the method 400 in connection with one or more of the siderails 46*a-d*, 146*a-d*, avoidance of such conditions may be facilitated. Likewise, in elevating or lowering the frame 26, 126, conditions may arise in which objects obstruct or impede further movement. The method 400 may aid in avoiding potential destruction to the object or the patient support 20, 120, or both.

Various alterations and changes can be made to the above-described embodiments without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A control system for controlling movement of a component of a patient support from a first position to a second position, said control system comprising:

a sensor configured to provide sensor output indicative of an operating characteristic of the patient support;

a controller operably coupled to the component, the controller operable to obtain the sensor output, the controller configured to detect a pinch event based on a comparison between the sensor output and a pinch event criterion; and wherein the controller is operable to vary the pinch event criterion based on a direction of movement of the component from the first position to the second position, wherein the component is a foot section of the patient support, and wherein the pinch event criterion corresponds to a first pinch event criterion based on the foot section of the patient support moving from a generally horizontal position toward a lowered position, and wherein the pinch event criterion corresponds to a second pinch event criterion different from the first pinch event criterion based on the foot section of the patient support moving from the lowered position toward the generally horizontal position.

2. The control system of claim 1 wherein:

the component of the patent support is an actuator of the patient support;

an electric motor directs movement of the actuator from the first position to the second position;

electric motor circuitry is operable to direct operation of the electric motor; and the electric motor circuitry is operable to direct supply of power to the electric motor to move the actuator from the first position to the second position.

3. The control system of claim 2 wherein the actuator is coupled to a patient support component of the patient support, and wherein the patient support component is at least one of a foot section of the patient support, a middle section of the patient support, a side rail of the patient support and a frame of the patient support.

4. The control system of claim 2 wherein the operating characteristic of the patient support is a sensed characteristic of power supplied to the electric motor, and comprising a motor sensor configured to provide motor sensor output indicative of the sensed characteristic of power, and wherein the pinch event is detected in response to the motor sensor output being equal to or greater than a first threshold.

5. The control system of claim 2 wherein a motor torque threshold is provided, and wherein the pinch event is detected based on a determination of whether a motor sensor output is indicative of a motor torque being greater than the motor torque threshold.

6. The control system of claim 5 comprising a motor sensor configured to provide the motor sensor output, wherein the motor sensor output is indicative of a speed of the electric motor, wherein the motor torque is determined based on at least one of the speed of the electric motor and the operating characteristic of the patient support.

7. The control system of claim 2 wherein the operating characteristic of the patient support is current supplied to the electric motor.

8. The control system of claim 1 wherein the sensor is a load cell such that the sensor output corresponds to a force applied to the patient support.

9. The control system of claim 1 wherein:

first pinch event criterion is associated with the first position of the component;

second pinch event criterion is associated with the second position of the component;

the controller is operable, with the component in the first position, to conduct a first comparison between the operating characteristic and the first pinch event criterion to detect a pinch event; and the controller is operable, with the component in the second position, to conduct a second comparison between the operating characteristic and the second pinch event criterion to detect a pinch event.

10. A control system for controlling a component of a patient support, the component being displaceable between a first position and a second position, said control system comprising:

a controller operable to obtain sensor output pertaining to an operating characteristic of the patient support, the controller configured to detect a pinch event based on a comparison between the sensor output and a pinch event criterion; and wherein the controller is operable to vary the pinch event criterion based on a direction of movement of the component from the first position to the second position, wherein the component is a foot section of the patient support, and wherein the pinch event criterion corresponds to a first pinch event criterion based on the foot section of the patient support moving from a generally horizontal position toward a lowered position, and wherein the pinch event criterion corresponds to a second pinch event criterion different from the first pinch event criterion based on the foot section of the patient support moving from the lowered position toward the generally horizontal position.

11. The control system of claim 10 wherein:

the component is an actuator of the patent support;

the actuator is operable to displace a patient support component of the patient support in response to being driven by an electric motor; and electric motor circuitry operable to direct operation of the electric motor, the electric motor circuitry configured to direct supply of power via a supply output to the electric motor to drive the actuator.

12. The control system of claim 11 wherein a motor torque threshold is provided, and wherein the pinch event is detected based on a determination of whether the sensor output is indicative of a motor torque being greater than the motor torque threshold.

13. The control system of claim 11 wherein the sensor output includes a sensed characteristic of power supplied to the electric motor.

14. The control system of claim 11 wherein:

the pinch event criterion is a first event criterion pertaining to a speed of the electric motor;

the controller is operable to store a second event criterion pertaining to a characteristic of power supplied to the electric motor; and the controller is operable to detect a pinch event based on a) a comparison between the speed of the electric motor and the first event criterion and b) a comparison between a sensed characteristic of power supplied to the electric motor and the second event criterion.

15. The control system of claim 10 wherein the sensor output corresponds to an external force applied to the patient support.

16. The control system of claim 10 wherein:

first pinch event criterion is associated with the first position of the component;

second pinch event criterion is associated with the second position of the component;

the controller is operable, with the component in the first position, to conduct a first comparison between the sensor output and the first pinch event criterion to detect a pinch event; and the controller is operable, with the component in the second position, to conduct a second comparison between the sensor output and the second pinch event criterion to detect a pinch event.

* * * * *